HERMANN ENDEMANN, OF NEW YORK, N. Y.

Letters Patent No. 87,653, dated March 9, 1869.

IMPROVED ARTIFICIAL BONE-BLACK.

The Schedule referred to in these Letters Patent and making part of the same.

*To all whom it may concern:*

Be it known that I, HERMANN ENDEMANN, of the city, county, and State of New York, have invented a new and improved Substitute for Bone-Black; and I do hereby declare the following to be a full, clear, and exact description thereof, which will enable those skilled in the art to make and use the same.

This invention relates to a substitute for bone black, which is to be used particularly in the manufacture of sugar, and which not only can be produced at less expense than bone-black, but which also obviates the necessity of being revivified by an expensive process, so that it can be used with much better advantage and much less expense than bone-black.

My substitute for bone-black is composed of clay (or silicate of alumina) and carbon produced by tar, or some other carbonizing-substance, and to these ingredients may also be added a certain percentage of hydrated sesquioxide of iron, and a small quantity of salt.

These ingredients I use in about the following proportion: clay, ten parts; tar, three parts; or, instead thereof, I can use, clay, from eight to nine parts; hydrated sesquioxide of iron, $(2Fe_2O_3+3HO,)$ from one to two parts; tar, three parts; and, in some cases, it is of advantage to add thereto, common salt, one part.

These ingredients are mixed with a sufficient quantity of water to form a plastic mass, which is moulded into bricks and dried.

When dry, the bricks are burned, care being taken that the carbon or coal formed is not consumed by coming in contact with the atmospheric air.

As soon as the emission of hydrocarbons ceases, the burning-process is finished.

After the bricks have cooled, they are moistened with water, and left for some time, whereby their hardness is materially increased, and after that the bricks are broken up, by means of stampers, and then sifted.

If salt has been used in the compound, the sifted mass is washed with water to remove this salt, and it is then exposed in thin layers to the action of the air, to produce the oxidation of the iron, if such is contained in the mass in a finely-divided state.

Thus prepared, my substitute is ready for use.

In some cases, I simply mix tar and clay, as above stated, mould, burn the bricks, and reduce them to pieces of the required size.

By the addition of sesquioxide of iron, the putrefaction of the organic substances absorbed by my substitute from the sugar is counteracted, and the oxidation of the iron is promoted by the admixture of common salt, and, furthermore, the coal produced is rendered more porous.

The effect of my compound depends mainly upon the condition of the clay used. Clay which contains a large percentage of lime must never be used.

The tar can be replaced by other carbonaceous substances, such as glue or honey, and particularly by the use of glue, I have obtained an effective product; still I prefer the use of tar, on account of its cheapness.

The finely-divided carbon in my substitute acts as an absorbent for color. The burned clay and the oxide of iron absorb the salts for potash and the lime.

If my substitute has been used for a certain length of time, and begins to lose its effectiveness, I wash it and expose it to the action of the air in thin layers, and as soon as the mass begins to dry, the oxide of iron produces an oxidizing effect on the organic matter previously absorbed by the mass.

Putrefaction, which frequently sets in with bone-black, is counteracted by the oxide of iron.

Having thus described my invention,

What I claim as new, and desire to secure by Letters Patent, is—

1. A substitute for bone-black, composed of clay (silicate of alumina) and carbon, separated from a carbonizing-substance, substantially in the manner herein described.

2. A substitute for bone-black, composed of clay, hydrated sesquioxide of iron, and carbon, mixed together, about in the proportion and substantially in the manner specified.

3. A substitute for bone-black, composed of clay, hydrated sesquioxide of iron, carbon, and salt, substantially as described.

This specification signed by me, this 30th day of January, 1869.

H. ENDEMANN.

Witnesses:
W. HAUFF,
ERNEST F. KASTENHUBER.